(12) United States Patent
Binder et al.

(10) Patent No.: US 6,966,981 B2
(45) Date of Patent: Nov. 22, 2005

(54) REPLACEABLE FILTER CARTRIDGE WITH SUPPORT ELEMENT AND LIQUID FILTER WITH SUCH A FILTER CARTRIDGE

(75) Inventors: Walter Binder, Backnang (DE); Klaus Mack, Hardthausen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/438,881

(22) Filed: May 16, 2003

(65) Prior Publication Data

US 2003/0196939 A1 Oct. 23, 2003

Related U.S. Application Data

(62) Division of application No. 09/909,991, filed on Jul. 23, 2001, now abandoned.

(30) Foreign Application Priority Data

Jul. 21, 2000 (DE) ................................ 100 35 555

(51) Int. Cl.[7] ............................................. B01D 35/153
(52) U.S. Cl. ....................... 210/136; 210/429; 210/440; 210/450; 210/457; 210/DIG. 17
(58) Field of Search ................................ 210/136, 429, 210/440, 450, 457, DIG. 17; 137/854

(56) References Cited

U.S. PATENT DOCUMENTS 5,413,712 A  5/1995  Gewiss et al.
5,589,060 A * 12/1996 Gebert et al. ................ 210/130
6,096,211 A *  8/2000 Koike et al. ................. 210/440
6,265,474 B1 *  7/2001 Fujimoto et al. ........... 524/120
6,375,836 B1 *  4/2002 Yano et al. .................. 210/130
6,485,635 B1 * 11/2002 Gandini et al. ............. 210/117

FOREIGN PATENT DOCUMENTS

| EP | 0 972 554 A1 | | 1/2000 |
| EP | 972554 A1 | * | 1/2000 |
| FR | 2 365 364 | | 4/1978 |
| FR | 2365364 A | * | 5/1978 |
| GB | 978517 A | * | 12/1964 |
| GB | 1 275 651 | | 5/1972 |
| GB | 1275651 A | * | 5/1972 |
| WO | WO 99/64134 | * | 12/1999 |

* cited by examiner

*Primary Examiner*—Matthew O. Savage
(74) *Attorney, Agent, or Firm*—Crowell & Moring LLP

(57) ABSTRACT

A replaceable filter cartridge assembly for a liquid filter and a liquid filter in which such a filter cartridge is installed. The filter cartridge 10 is provided with a support element 15, and a seat 20 for a sealing membrane 19 is provided on the support element 15. The sealing membrane seals the inlet 22 of the housing via a sealing edge 21 that acts as a return flow barrier over the inlet. The sealing membrane 19 also has a radial sealing surface 23 to provide a seal between the support element 15 and the outlet port 24 of the filter. This permits the filter cartridge to be manufactured in a particularly cost-effective manner and assures simple mounting within the housing. Since only the filter cartridge, which can be pushed onto the support element 15, needs to be exchanged, very little material has to be disposed of when the filter is replaced, which further increases the cost-effectiveness of the filter in use.

11 Claims, 1 Drawing Sheet

REPLACEABLE FILTER CARTRIDGE WITH SUPPORT ELEMENT AND LIQUID FILTER WITH SUCH A FILTER CARTRIDGE

CROSS-REFERENCE TO RELATED APPLICATIONS

This application is a division of U.S. patent application Ser. No. 09/909,991 filed on Jul. 23, 2001, now abandoned.

BACKGROUND OF THE INVENTION

The invention relates to a exchangeable filter cartridge for a liquid filter with an annularly constructed filter medium arranged on a support element. The invention further relates to a liquid filter in which such a filter cartridge is installed.

Filter cartridges of the initially described type are known, for instance, from U.S. Pat. No. 5,413,712. This document describes a filter cartridge comprising a support tube holding the filter medium whose end faces are provided with end disks. This filter cartridge can be replaced by removing a cover from the filter housing. A spring in the cover pushes the installed filter cartridge axially against a centrally arranged outlet port. A sealing membrane provides an axial seal between the outlet port and the end disk of the filter cartridge. The sealing membrane is simultaneously configured as a return flow barrier or check valve.

The disadvantage of the described prior art is the use of a spring to produce an axial force to act against the seal. This spring is an additional component in the filter unit and thus reduces the economic efficiency of the solution. Moreover, the axial force that can be applied by the spring to provide a seal is limited. Increasing the axial force by making the spring stiffer has the disadvantage of increasing the closing forces that have to be applied to the cover, which makes it more difficult to replace the filter element.

SUMMARY OF THE INVENTION

It is an object of the invention to provide a cost effective filter cartridge.

Another object of the invention is to provide a filter cartridge which is easily mountable in a filter.

A further object of the invention is to provide a filter unit including a cost effective, easily mountable filter cartridge.

These and other objects are achieved in accordance with the present invention by providing an exchangeable filter cartridge assembly for a liquid filter comprising an annular filter medium with sealed end faces; a support element mounted interiorly of the annular filter medium for supporting the filter medium, the support element having a seat in an end area for a sealing membrane which serves as a return flow barrier, the sealing membrane having a sealing edge for support inside the liquid filter and for sealing a filter inlet, and an additional sealing surface to provide a radial seal between the support element and a filter housing.

In accordance with a further aspect of the invention, the objects are achieved by providing a liquid filter comprising an openable housing with an inlet and an outlet, and an annular filter cartridge disposed on a central support element in the housing, an elastic sealing membrane connected to a seat provided on one end of the support element, the sealing membrane having a sealing edge which is supported inside the housing in such a way that it forms a return flow barrier over the inlet.

The filter cartridge according to the invention has a support element, which is surrounded by an annular filter medium. The support element may have a circular or elliptical cross section. It must have openings through which the liquid from the filter medium can flow into the interior of the support element. The filter medium is mounted on the support element in such a way that the support element prevents it from being deformed or collapsing. The filter medium is preferably made of a pleated or star-folded filter paper. Alternatively, rolls of a nonwoven material or multi-layered filter media of any shape may be used, all of which have in common that they annularly surround the support element.

The invention is characterized by a seat that is formed in the support element to receive a sealing membrane, which may integrate two functions. On the one hand the sealing membrane has a sealing edge, which is supported inside the housing in such a way that the inlet is sealed. When there is no flow through the filter, this creates a return flow barrier or check valve for liquid residues that may remain in the housing, for instance, when the filter is removed. When liquid flows into the inlet of the filter, the sealing edge of the sealing membrane is lifted, so that the liquid can flow into the unfiltered side of the housing volume of the filter.

The second function of the sealing membrane is to provide a direct radial seal between the support element and any housing part. This makes it possible, for instance, to tightly separate the unfiltered side from the filtered side. It is particularly advantageous that the support element may be sealed with respect to an outlet port that connects the interior of the support element with the outlet. The interior of the filter simultaneously forms the filtered side of the filter. This results in a particularly compact embodiment of the liquid filter of the invention.

The configuration of the seat on the support element facilitates mounting of the filter cartridge during initial installation or in any subsequent filter replacement. The filter cartridge and the sealing membrane can be preassembled and then inserted into the housing. The filter cartridge unit, as a whole, is simple to handle, which minimizes possible installation errors. At the same time, the radial seal between center tube and housing assures that the filter functions reliably, since axial tolerances are not critical to the functioning of the seal. An additional spring to produce the axial pressure of the filter cartridge against the housing is not necessary and can be omitted. This simultaneously reduces the mounting forces required to screw on the cover and consequently simplifies the mounting process.

In accordance with a further embodiment of the invention, the sealing membrane is permanently connected to the end area of the support element. This may be accomplished, for instance, by producing the support element using a two-component molding technique. For instance, the support element can be injection-molded from plastic and the sealing membrane from an elastomer that adheres to the plastic. Another option is to adhesively bond the sealing membrane to the support element. In either case, the reliability of the seal between support element and sealing membrane is enhanced, which increases the reliability of the filter unit.

In a further embodiment of the invention, the end area of the support element is provided with a safety interlock to create a form-fit connection between sealing membrane and support element. This assures that the sealing membrane will remain securely on the filter cartridge when the cartridge is removed. This can be accomplished, in particular, in that the form-fit connection acts in the direction of the radial seal between support element and housing. As long as there is increased friction during removal between these two components as a result of the sealing effect, the form-fit connection between the sealing membrane and the support element is simultaneously assured. When the filter cartridge is removed, however, the sealing membrane can be easily replaced since it is made of an elastomer, so that it can be stretched to overcome the interlocking connection and remove the sealing membrane.

A further embodiment of the invention provides that the support element protrude axially beyond the filter medium. This creates sufficient clearance for the sealing membrane, so that the functional reliability of the filter is further enhanced.

In accordance with one specific embodiment of the invention, the filter cartridge is constructed in such a way that the filter medium is replaceably arranged on the support element. This can be achieved particularly in that the end faces of the filter medium are provided with end disks or foils, which simultaneously seal the end faces of the filter medium and provide a radial seal with respect to the support element. The end disks may advantageously be made of nitrile butadiene rubber. This is an elastomeric mixture that remains sufficiently resilient after a curing process to provide a seal with respect to the support element. The curing process simultaneously produces a tight connection with respect to the end faces of the filter medium.

The described embodiment of the filter cartridge has the advantage that a minimum amount of material has to be discarded when the filter medium is replaced. Both the support tube and the sealing membrane can be reused. The filter medium and the end disks are completely free of metal, which facilitates their disposal, for instance by incineration.

If the sealing membrane is permanently connected to the support element, the filter medium on the support element can be replaced via the opposite end. The support element is inserted into the new filter medium so that a new seal is produced between the end disks and the support element.

The support element is advantageously made in one piece. This is preferably accomplished by plastic injection molding and further optimizes filter cartridge production with respect to costs.

A particularly advantageous embodiment of the liquid filter unit is obtained if the housing has a substantially cylindrical shape and the inlet and outlet are accommodated in the base plate of the housing. The base plate furthermore has a threaded socket to attach the liquid filter at the installation site. Thus the configuration essentially corresponds to that of conventional disposable filters, so that the housing of the exchangeable filter can be installed instead of a throwaway filter.

When the filter is due to be replaced, the liquid filter as a whole is unscrewed from the installation site. The sealing membrane prevents any liquid residues from flowing out of the filter housing. The filter housing is then opened to its optimal position so that the residual oil remains in the housing while the filter cartridge is being replaced. After the housing is mounted, the liquid filter can be remounted at the installation site.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
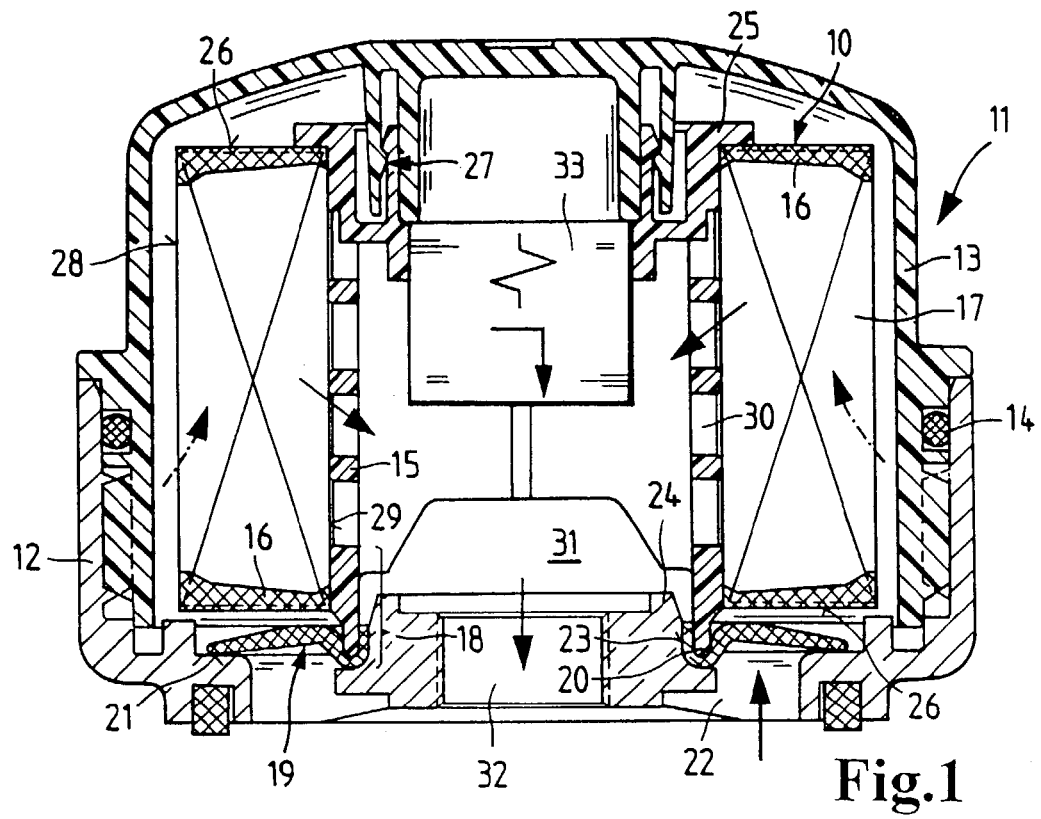
FIG. 1 is a cross section through the center of a liquid filter according to the invention.

The liquid filter according to FIG. 1 comprises a filter cartridge 10 disposed inside a housing 11 comprising a base plate 12 and a screw-on cover 13, which is screwed together with the base plate with an interposed O-ring 14 to form a seal. The filter assembly comprises a support element 15 onto which is slipped a star-folded filter paper that is provided with end disks 16 in such a way that a radial seal is obtained between the support element 15 and the end disks 16. Further, in an end area 18 of the support element, a sealing membrane 19 is mounted in a seat 20. The sealing membrane has a sealing edge 21 which is supported against the base plate 12 and thus provides a seal with respect to the inlets 22 which are also located in the base plate. Further, the sealing membrane has a sealing surface 23 to ensure a radial seal between seat 20 on support element 15 and an outlet port or nipple 24 which is accommodated in the base plate.

The support element further comprises a stop or abutment 25 for one of the end faces 26 of the filter cartridge 10. The filter cartridge is pushed onto the support element prior to mounting the sealing membrane 19 on the support tube 15. The entire filter cartridge/support tube assembly is fixed by means of a snap connection 27 whose interacting elements are accommodated on the support element 15 and in the screw-on cover 13. As a result, when the screw-on cover 13 is removed, the filter cartridge 10 remains inside the cover.

When the filter is in operation, the fluid flows in the direction of the arrows through inlet 22 to an unfiltered side 28. It then flows radially inwardly through filter paper 17 and reaches a filtered side 29, which communicates with the interior 31 of the support tube 15 via openings 30 made in support element 15. From there, the filtered fluid leaves housing 11 through an outlet 32 located in the outlet nipple 24.

In addition, a schematically indicated bypass valve 33 is arranged in support element 15 in case of excessive pressure buildup. This bypass valve short-circuits the unfiltered side 28 to the filtered side 29 to assure a sufficient flow of liquid even if the filter paper clogs. Such an arrangement is important, for instance, when fluid filters are used to filter the lubricating oil of an internal combustion engine, as depicted here.

Figure 2:
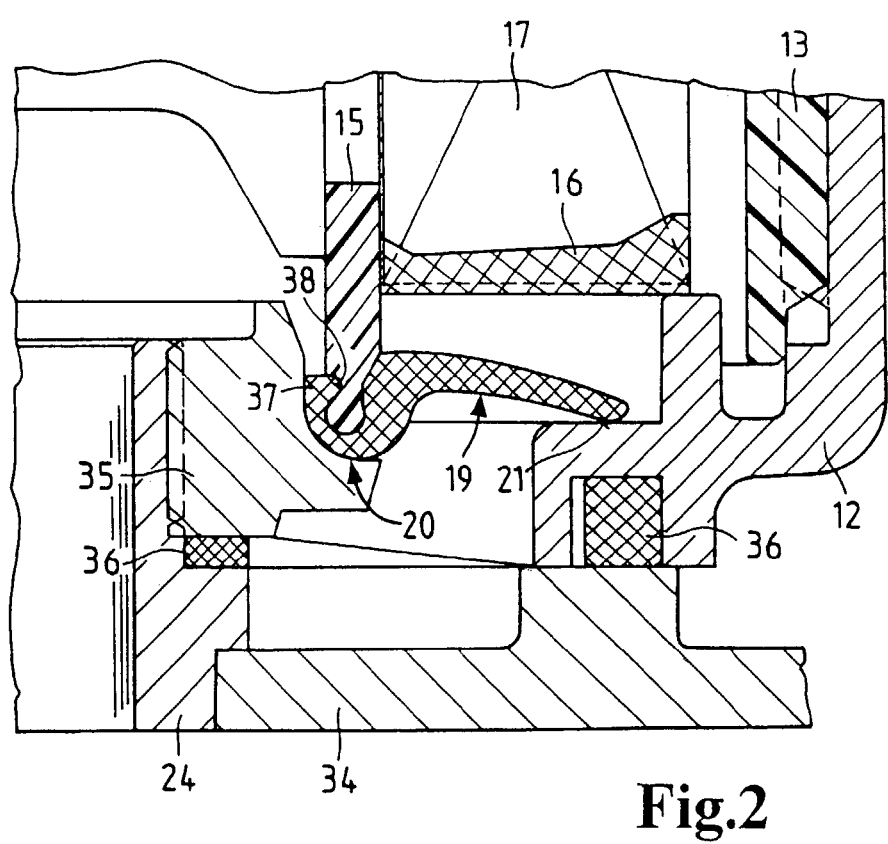
FIG. 2 is an enlarged detail X according to FIG. 1 showing an alternative embodiment of the sealing membrane.

FIG. 2 shows the liquid filter in its mounted state on the installation site, which is shown in part and may, for instance, be the engine block 34 of an internal combustion engine. A threaded socket 35 is formed in outlet port 24 of base plate 12. Socket 35 is screwed onto a mounting nipple at the installation site and serves to mount the filter housing. Sealing rings 36 ensure a seal of the housing with respect to the environment and between inlets 22 and outlet 32 of the liquid filter.

FIG. 2 further shows an alternative embodiment of the sealing membrane 19. In this embodiment, the membrane 19 has an additional lip 37, which engages with an interlocking recess 38 in seat 20 of the support element. As soon as the support element is pushed onto the outlet port or nipple 24, lip 37 is pressed into the interlocking depression 38. As a result, when the filter cartridge/support tube assembly is removed, the sealing membrane 19 does not remain in the housing but is separated together with the support element 15 from the base plate 12 of the housing.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An exchangeable filter cartridge assembly for a liquid filter comprising an annular filter medium with sealed end faces; a support element mounted interiorly of the annular filter medium for supporting the filter medium, said support element having a seat in an end area for a sealing membrane which serves as a return flow barrier, said sealing membrane having a sealing edge for support inside the liquid filter and for sealing a filter inlet, and an additional sealing surface to provide a radial seal between the support element and a filter housing, said sealing membrane further having a radial lip which engages with an interlocking recess in the seat in the end area of the support element in an interlocking manner to create a form-fit connection between the sealing membrane and the support element.

2. A filter cartridge assembly according to claim 1, wherein the sealing membrane which serves as a return flow barrier is permanently connected to the end area of the support element.

3. A filter cartridge assembly according to claim 1, wherein the end area of the support element extends axially beyond an adjacent end face of the filter medium.

4. A filter cartridge assembly according to claim 1, wherein the filter medium is replaceably disposed on the support element.

5. A filter cartridge assembly according to claim 1, wherein at least one end Lace of the filter medium is connected with an end disk for forming a seal.

6. A filter cartridge assembly according to claim 5, wherein said end disk is made of nitrile-butadiene rubber.

7. A filter cartridge assembly according to claim 1, wherein the support element is constructed as one piece.

8. A filter cartridge assembly according to claim 1, wherein the additional sealing surface of the sealing membrane forms a radial seal between the support element and an outlet port of the filter housing.

9. A liquid filter comprising an openable housing with an inlet and an outlet, and an annular filter cartridge disposed on a central support element in said housing, an elastic sealing membrane connected to a seat provided on one end of said support element, said sealing membrane having a sealing edge which is supported inside the housing in such a way that it forms a return flow barrier over the inlet, and said sealing membrane further having a radial lip which engages with an interlocking recess in the seat on said one end of support element in an interlocking manner to create a form-fit connection between the sealing membrane and the support element.

10. A liquid filter according to claim 9, wherein said housing comprises a base plate and a screw-on cover, and said support element is detachably connected to the housing cover by a snap connection.

11. A liquid filter according to claim 9, wherein said filter is an oil filter for lubricating oil of an internal combustion engine.

* * * * *